United States Patent [19]

Bosdet

[11] Patent Number: 4,566,768
[45] Date of Patent: Jan. 28, 1986

[54] MOUNT FOR SUPPORTING CAMERA HAVING ELONGATED LENS

[76] Inventor: Charles L. Bosdet, 310 S. Prospect, #6, Redondo Beach, Calif. 90277

[21] Appl. No.: 544,737

[22] Filed: Oct. 24, 1983

[51] Int. Cl.⁴ .................. G03B 17/12; G03B 17/56
[52] U.S. Cl. ................................ 354/81; 354/293; 350/252; 350/257; 352/243
[58] Field of Search .............. 354/293, 81, 82, 126, 354/286; 248/183, 163.1; 350/248, 252, 240, 245, 257; 352/243

[56] References Cited

U.S. PATENT DOCUMENTS

| | | | |
|---|---|---|---|
| 2,599,269 | 6/1952 | Markle | 248/183 |
| 3,550,519 | 12/1970 | Lewis | 354/293 |
| 3,855,602 | 12/1974 | Hoos | 354/293 |
| 3,984,855 | 10/1976 | Baczynsky | 248/183 |
| 4,081,814 | 3/1978 | Bulland | 354/82 |
| 4,095,244 | 6/1978 | Yokoyama et al. | 352/243 |
| 4,104,623 | 8/1978 | Sloop | 354/82 |
| 4,249,817 | 2/1981 | Blau | 248/183 |
| 4,330,176 | 5/1982 | Kawai et al. | 354/286 |

FOREIGN PATENT DOCUMENTS

| | | | |
|---|---|---|---|
| 234510 | 11/1963 | Austria | 354/293 |
| 620924 | 7/1978 | U.S.S.R. | 350/257 |

Primary Examiner—A. A. Mathews
Attorney, Agent, or Firm—Edward A. Sokolski

[57] ABSTRACT

A camera mount for supporting a camera having an elongated attachment lens, such as a telephoto lens, on a stand such as a tripod. The device includes an L-shaped bracket which has a threaded aperture in one of the legs thereof for use in attaching the bracket to the stand and an elongated slot in this same leg of the bracket along which the body of a camera can be adjustably positioned and secured to the bracket. A camera lens support member is adjustably positioned along the other leg of the L-shaped bracket and is secured thereto. This support member has an arcuate cutout formed therein to match the curvature of the lens barrel. A resilient edge member is installed around this cutout portion and engages an end portion of the lens barrel in a retaining relationship. The second mentioned leg of the L bracket may have a support arm removably attached thereto for supporting a flash attachment.

8 Claims, 3 Drawing Figures

MOUNT FOR SUPPORTING CAMERA HAVING ELONGATED LENS

This invention relates to camera mounts, and more particularly to such a mount for use in retaining a camera having an elongated lens, such as a telephoto lens, on a stand such as a tripod.

It is quite important in still photography to provide means for mounting a camera with an elongated lens in a variety of different positions for taking shots from various angles. The lens, which is often a telephoto or a wide angle, must be properly supported so that it does not droop or vibrate, the first of which conditions could cause damage to the lens and/or camera, as well as misalignment thereof, and the second which could change the focusing of the lens. A prior art camera mount for a camera employing an elongated lens is described in U.S. Pat. No. 4,249,817. In the device of this prior art patent, the camera is supported on a releasable clamping mechanism by means of an adapter which includes a clamping ring which clamps the barrel of the lens at a point therealong close to the main body of the camera. This type of support has several shortcomings. First, it is limited for use to a particular type of lens, i.e., one that will allow a clamp type device to be attached thereto without disrupting the normal function of the lens. Further, it provides no support for the remote end of the lens and thus does not safeguard against the undesirable effects of lens droop or lens vibration.

The device of the present invention overcomes the aforementioned shortcomings of the prior art in providing a simple and relatively economical device for mounting a camera on a support such as a tripod in which the camera can be variously positioned as may be required and wherein an elongated lens, which may be a telephoto lens, is retained on a stable resilient support which safeguards against the ill effects of vibration. The device of the present invention achieves the aforementioned end results by employing an L-shaped bracket having a first arm which is removably attached to a stand, such as a tripod, in a fixed position thereon, and an elongated slot along which the body of the camera can be positioned and retained in place in the selected position. A lens support member is adapted to be variously positioned along the other arm of the L-shaped bracket and retained to the arm in a selected position. This lens support bracket has a arcuate cutout formed therein shaped to match the curvature of the end portion of the lens assembly. A resilient edge liner member is installed around the cutout portion, the end portion of the lens being supported in the cutout portion against the resilient edge in engagement therewith. An adjustable arm member may also be positionably connected to the last mentioned arm of the L for use in supporting a flash attachment.

It is therefore an object of this invention to facilitate the adjustable support of a camera having an elongated lens on a support stand;

It is a further object of this invention to minimize lens droop in the support of a camera having an elongated lens;

It is still another object of this invention to eliminate the ill effects of lens vibration in the support of a camera having an elongated lens.

Other objects of the invention will become apparent as the description proceeds in connection with the accompanying drawings of which:

Figure 1:
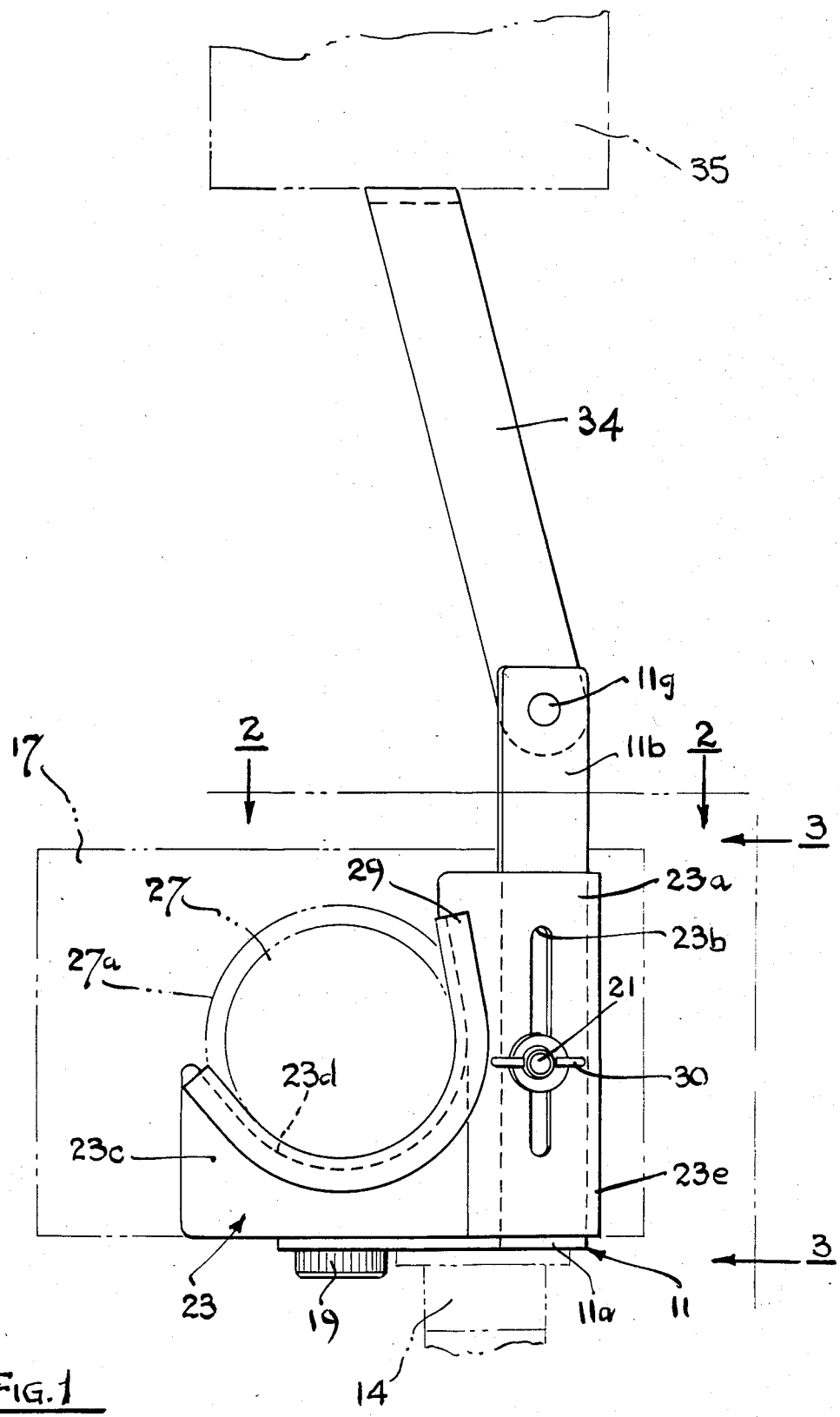
FIG. 1 is a front elevational view illustrating a preferred embodiment of the device of the invention.

Referring now to the figures, a preferred embodiment of the invention is illustrated. L-shaped bracket 11 includes a longer leg 11a and a shorter leg 11b at right angles to the longer leg, the shorter leg being vertically oriented as shown in the drawings, and the longer leg, horizontally oriented. Leg 11a has a threaded aperture 12 formed therein to which the support member 14, which may comprise a tripod, is threadably attached by means of a suitable threaded stud member 14a. An elongated slot 15 is formed in leg 11a, the main body portion 17 of a camera being selectively positioned along the slot and attached thereto at the selected position by means of a knurled lock knob which has a threaded screw portion 19a which engages a corresponding threaded portion in the base of the camera. The shorter leg 11b of the L-shaped bracket has a threaded stud 21 extending outwardly therefrom.

Figures 2, 3:
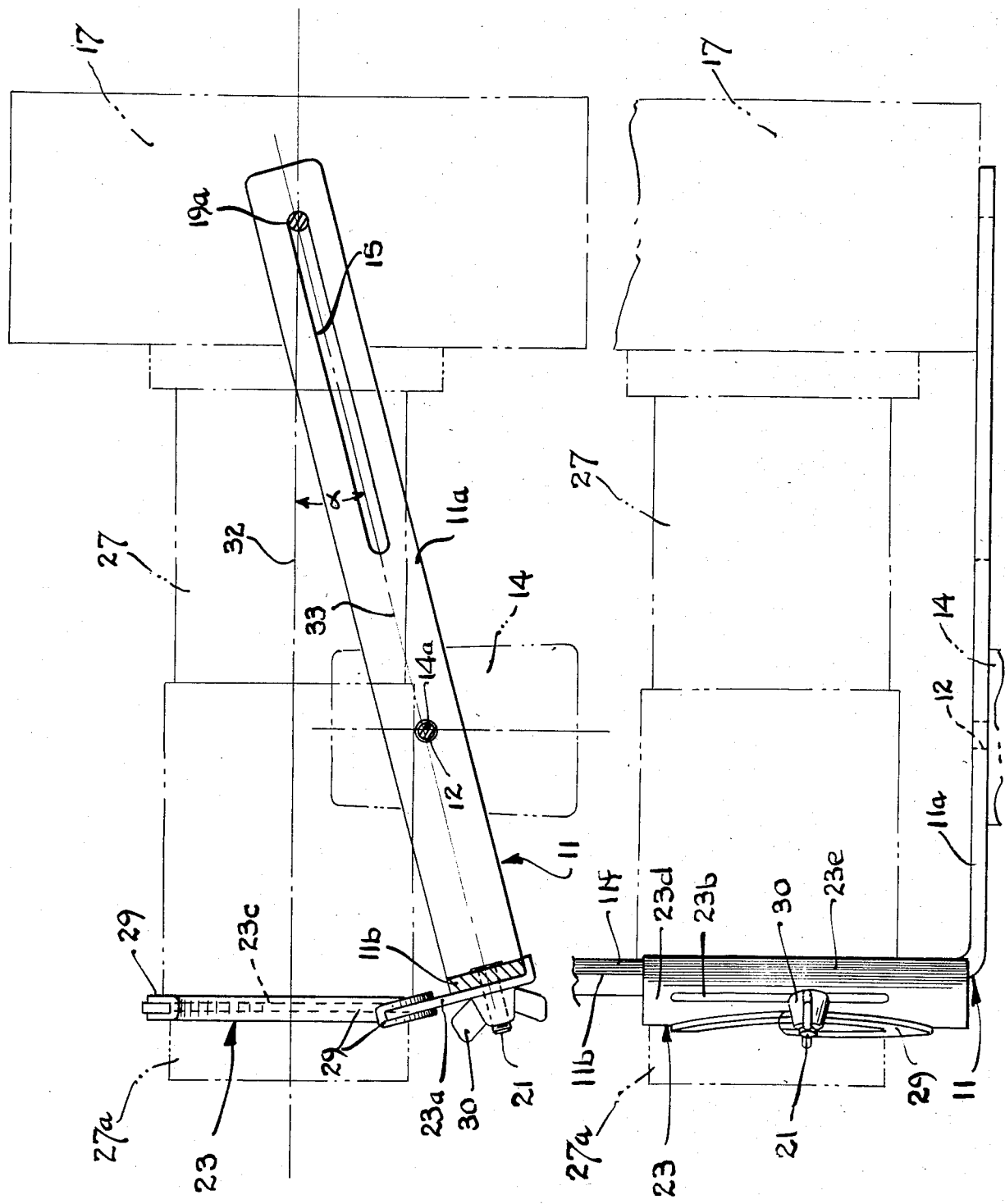
FIG. 2 is a top plan view taken along the plane indicated by 2—2 of FIG. 1.
FIG. 3 is a side elevational view of the preferred embodiment of the invention taken along the plane indicated by 3—3 in FIG. 1.

Lens support bracket 23 has a first portion 23a with an elongated slot 23b formed therein and a second portion 23c which has an arcuate cutout portion 23d formed therein, the bracket 23 being in the general shape of the letter "J". Arcuate cutout portion 23d mates with the end barrel portion 27 of the camera telephoto lens. Mounted around the edge of cutout section 23d is a resilient liner member 29 which, as best can be seen in FIG. 2, is in the form of a strip which has a slotted configuration so that it grips the sides of the cutout portion in retention on bracket member 23. Bracket 23 is mounted on leg 11b of the L-shaped bracket by means of wing nut 30 and is positioned as may be desired along the extent of slotted portion 23b. The upstanding portion 23a of the J-shaped bracket 23 is angled from the portion 23c having the cutout formed therein by an angle $a$, as shown in FIG. 2, which is the angle between the longitudinal centerline 32 of the base of camera 17 and the longitudinal centerline 33 of bracket arm 11a. This angular relationship assures that the lens barrel 27 is aligned with bracket portions 23c and will properly seat itself within the arcuate area formed by member 29. Bracket member 23 has a lip portion 23e which abuts against the side edge portion 11f of bracket arm 11b to prevent bracket 23 from rotating once it is installed in position. An arm member 34 may be removably attached to the end of leg 11b by means of a threaded stud 11g which extends from the arm 11b and fits through a mating hole (not shown) in arm 34, the arm being retained in position by a suitable wing nut (not shown). Arm 34 may be employed to support a flash attachment 35.

The camera 17, along with its telephoto lens 27 or the like, can be conveniently supported for variable positioning on a support stand 14 which may comprise a tripod. The end portion 27a of the lens is retained firmly in the arcuate liner member 29. The lens is free to be rotatably adjusted against the friction of this member but is cushioned against vibration which might upset the focusing adjustment. Further the lens is firmly supported against any droop effects which might occasion damage thereto and/or disrupt the sighting of the camera. The device is simple in construction and can be assembled for use and disassembled for transportation in relatively short order.

While the invention has been described and illustrated in detail, it is to be clearly understood that this is intended by way of illustration and example only and is not to be taken by way of limitation, the spirit and scope of the invention being limited only by the terms of the following claims.

I claim:

1. A camera mount for supporting a camera having an elongated barrel-shaped lens on a stand comprising
    an L-shaped bracket having first and second arms substantially at right angles to each other,
    means for removably attaching said first arm to said stand,
    means for removably and adjustably attaching the body of the camera to said first arm at a selected position therealong,
    a lens support bracket member having first and second portions, said second portion having an arcuate cutout formed therein,
    means for removably and adjustably attaching said lens support bracket to said second arm at a selected position along the first portion thereof,
    resilient liner means along the edge of said arcuate cutout,
    the barrel of said lens being aligned with said arcuate cut out and the end portion of said barrel and being seated in said arcuate cutout against said liner means.

2. The camera mount of claim 1 wherein the camera has a base with a longitudinal centerline (32) and said first bracket arm has a longitudinal centerline (33), and the first and second portions of said lens support bracket member are angulated with respect to each other by a predetermined angle, α, which is the angle between the longitudinal centerline (32) of the base of the camera and the longitudinal centerline (33) of said first bracket arm.

3. The camera mount of claim 1 wherein the means for removably and adjustably attaching the body of the camera to the first arm comprises screw member means for threadably engaging the body of the camera and an elongated slot formed in said first arm, said screw member being positioned in the elongated slot at said selected position therealong.

4. The camera mount of claim 1 wherein the resilient liner means comprises a slotted strip which grips the sides of the cutout.

5. The camera mount of claim 1 wherein the means for removably and adjustably attaching the lens support bracket to the second arm comprises a threaded stud extending outwardly from said second arm, an elongated slot formed in the first portion of said support bracket, said stud being positioned in the elongated slot.

6. The camera mount of claim 1 and further including arm means removably attached to said first arm for supporting a flash attachment.

7. The camera mount in claim 5 wherein the first portion of said support bracket has a lip portion running along one edge thereof substantially parallel to the slot formed in said first portion, said lip abutting against a side edge of said second arm to prevent rotation of the bracket.

8. A camera mount for supporting a camera having a base with a longitudinal centerline (32) and an elongated barrel-shaped lens on a stand comprising an L-shaped bracket having first and second arms substantially at right angles to each other,
    means for removably attaching said first arm to said stand,
    the first arm of said L-shaped bracket having an elongated slot formed therein,
    screw means fitted in the elongated slot of said first arm and threadably engaging the body of said camera for attaching the camera to the first arm at a selected position along the elongated slot thereof,
    a lens support bracket member having a first portion with a longitudinal centerline (33) and a second portion angulated with respect to said first portion by a predetermined angle, α, which is the angle between the longitudinal centerline (32) of the base of the camera and the longitudinal centerline (33) of said first bracket portion, said second portion having an arcuate cutout formed therein, said first portion having an elongated slot formed therein,
    said second arm of said L-shaped bracket having a threaded stud extending outwardly therefrom, said stud being fitted in the slot formed in the second portion of the lens support bracket at a selected position along the slot,
    nut means engaging the threaded stud for securing the lens support bracket to he second arm, and
    a resilient slotted strip fitted on the edge of said arcuate cutout,
    the barrel of the lens being aligned with said arcuate cutout and the end portion of said barrel and being seated in the arcuate cutout against the resilient strip.

* * * * *